(12) United States Patent
Kumar et al.

(10) Patent No.: US 11,431,483 B2
(45) Date of Patent: *Aug. 30, 2022

(54) TIMESTAMP BASED ONBOARDING PROCESS FOR WIRELESS DEVICES

(71) Applicant: Cypress Semiconductor Corporation, San Jose, CA (US)

(72) Inventors: Dharam Kumar, Bangalore (IN); Sahana D N, Mangalore (IN); Prejith Padmanabhan, Bangalore (IN); Sathish Kumar Mani, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 256 days.

This patent is subject to a terminal disclaimer.

(21) Appl. No.: 16/898,301

(22) Filed: Jun. 10, 2020

(65) Prior Publication Data

US 2020/0412530 A1 Dec. 31, 2020

Related U.S. Application Data

(63) Continuation of application No. 16/685,777, filed on Nov. 15, 2019, now Pat. No. 10,693,633.
(Continued)

(51) Int. Cl.
*H04L 9/08* (2006.01)
*H04L 5/00* (2006.01)
(Continued)

(52) U.S. Cl.
CPC .......... *H04L 9/0827* (2013.01); *H04L 5/0055* (2013.01); *H04L 9/0863* (2013.01);
(Continued)

(58) Field of Classification Search
CPC ... H04L 9/0827; H04L 9/0863; H04L 9/3215; H04L 9/3228; H04L 9/3297; H04L 9/12;
(Continued)

(56) References Cited

U.S. PATENT DOCUMENTS 9,258,295 B1 2/2016 Nedeltchev et al.
9,648,015 B1 5/2017 Avetisov et al.
(Continued)

FOREIGN PATENT DOCUMENTS

WO 2015130734 A1 9/2015
WO 2019089164 A1 5/2019

OTHER PUBLICATIONS

Afonso, Jose, "IoT System for Anytime/ Anywhere Monitoring and Control of Vehicles' Parameters," International Conference on Service Operations and Logistics, and Informatics (SOLI), IEEE, Sep. 2017, pp. 193-198; 6 pages.
(Continued)

*Primary Examiner* — Victor Lesniewski

(57) ABSTRACT

A method, apparatus, and system for provisioning a device onto a network using a non-secure communication channel between the device and a provisioner is described. The provisioner receives a timestamp-based on-time password (TOTP), and a universal resource identifier (URI) from the device and provides the TOTP and an out-of-band (OOB) UUID to a remote server over a secure communication channel identified by the URI. The device is then provisioned onto a network based on comparisons of the UUID and the TOTP.

20 Claims, 9 Drawing Sheets

Related U.S. Application Data

(60) Provisional application No. 62/769,100, filed on Nov. 19, 2018.

(51) Int. Cl.
*H04W 4/80* (2018.01)
*H04L 9/40* (2022.01)
*H04L 9/32* (2006.01)
*H04W 12/04* (2021.01)
*H04W 12/06* (2021.01)
*H04W 12/61* (2021.01)

(52) U.S. Cl.
CPC .......... *H04L 9/3215* (2013.01); *H04L 9/3228* (2013.01); *H04L 9/3297* (2013.01); *H04L 63/067* (2013.01); *H04L 63/0838* (2013.01); *H04L 63/0846* (2013.01); *H04L 63/18* (2013.01); *H04W 4/80* (2018.02); *H04W 12/04* (2013.01); *H04W 12/06* (2013.01); *H04W 12/068* (2021.01); *H04W 12/61* (2021.01)

(58) Field of Classification Search
CPC ... H04L 63/18; H04L 63/067; H04L 63/0838; H04L 63/0846; H04L 5/0055; H04L 1/1678; H04W 12/04; H04W 12/06; H04W 12/068; H04W 12/61; H04W 12/121; H04W 4/80; H04W 4/70
See application file for complete search history.

(56) References Cited

U.S. PATENT DOCUMENTS

| | | |
|---|---|---|
| 9,762,392 B2 | 9/2017 | Carrer et al. |
| 10,009,359 B2 | 6/2018 | Smith et al. |
| 10,225,243 B2 | 3/2019 | Murthy |
| 10,326,797 B1 | 6/2019 | Murray et al. |
| 10,341,348 B2 | 7/2019 | Smith et al. |
| 10,693,633 B2 | 6/2020 | Kumar et al. |
| 2002/0068554 A1 | 6/2002 | Dusse |
| 2008/0320566 A1 | 12/2008 | Herzog et al. |
| 2010/0262834 A1 | 10/2010 | Freeman et al. |
| 2012/0240204 A1 | 9/2012 | Bhatnagar et al. |
| 2014/0282978 A1 | 9/2014 | Lerner et al. |
| 2015/0023336 A1 | 1/2015 | Ilsar et al. |
| 2015/0121470 A1 | 4/2015 | Rongo et al. |
| 2015/0124968 A1 | 5/2015 | Scott et al. |
| 2015/0169860 A1 | 6/2015 | Kim et al. |
| 2016/0226862 A1 | 8/2016 | Song |
| 2017/0111170 A1 | 4/2017 | Baghdasaryan |
| 2017/0243203 A1 | 8/2017 | Bond et al. |
| 2017/0339120 A1 | 11/2017 | Zakaria et al. |
| 2017/0359342 A1 | 12/2017 | Magyar et al. |
| 2017/0359723 A1 | 12/2017 | Pal et al. |
| 2018/0041507 A1 | 2/2018 | Sivarajan et al. |
| 2018/0121921 A1 | 5/2018 | Woo |
| 2018/0152443 A1 | 5/2018 | Minatel et al. |
| 2019/0042779 A1 | 2/2019 | Agerstam et al. |
| 2019/0349198 A1 | 11/2019 | Patel et al. |
| 2020/0099685 A1* | 3/2020 | Wijaya .................... H04L 67/22 |
| 2022/0029985 A1* | 1/2022 | Malhotra ............ H04L 63/0838 |

OTHER PUBLICATIONS

Examiner-Initiated Interview Summary for U.S. Appl. No. 16/685,777 dated Mar. 2, 2020, 2 pages.

International Search Report for International application No. PCT/US19/62021 dated Feb. 7, 2020, 2 pages.

Keyscaler, "The Identity and Access Management Platform for IoT and Blockchain," Technical Insight Guide, 2019; 24 pages.

Rahman, Taibur, "Provisioning Technical Interoperability within ZigBee and BLE in IoT Environment," 2nd International Conference on Electronics, Materials Engineering & Nano-Technology (IEMENTech), IEEE, May 2018; 4 pages.

USPTO Notice of Allowance for U.S. Appl. No. 16/685,777 dated Mar. 2, 2020; 8 pages.

Written Opinion of the International Searching Authority for International application No. PCT/US19/62021 dated Feb. 7, 2020, 8 pages.

* cited by examiner

TIMESTAMP BASED ONBOARDING PROCESS FOR WIRELESS DEVICES

PRIORITY

This patent application is a continuation of U.S. Non-Provisional patent application Ser. No. 16/685,777, filed Nov. 15, 2019, which claims priority to U.S. Provisional Patent Application No. 62/769,100, filed Nov. 19, 2018, all of which are incorporated herein by reference.

TECHNICAL FIELD

The described embodiments relate generally to wireless networking. More particularly, the described embodiments relate to methods, systems and apparatuses for onboarding a wireless device onto a secure wireless network.

BACKGROUND

Many companies are building products that benefit from a connection to a cloud service via the internet. For example, whitegoods manufacturers are connecting appliances like dishwashers and refrigerators to the internet to provide better customer service through remote access to the devices, and TV manufacturers are using internet connectivity to enable content streaming.

Wi-Fi (Wireless Fidelity) is becoming the predominant connectivity technology for consumer connected products as well as many industrial and commercial connected products.

However, connecting these devices to the internet through Wi-Fi is difficult for some consumers; sometimes consumers have trouble entering the credentials like SSID and password accurately, and in many cases the inconvenience of entering Wi-Fi credentials and the dislike of the process prevents customers from buying connected products in first place. However, the model of Wi-Fi requires the Wi-Fi credentials to be put in the device in order to access the local network and the full bandwidth of the internet service. Onboarding a wireless device onto a secure network, such as Wi-Fi can be time consuming and require updates as Wi-Fi credentialing information is changed. This can be time consuming and inconvenient, and result in even more expensive support calls for manufacturers and internet service providers.

It is desirable to have a system, method and apparatus for onboarding wireless devices which is fast, can onboard multiple devices on the secure network with minimal latency, easy to set-up and requires minimal user-intervention. Such a system, method and apparatus will use a provisioning device (such as mobile phone) with which consumers are familiar and provides an increased level of security.

SUMMARY

An embodiment includes a method for provisioning one or more wireless devices on a secure network. The method may allow for simultaneous provisioning of multiple devices on the secure network. The method includes devices advertising over a wireless medium to onboard to the secure network. The method further includes receiving an acknowledgement (ACK) from a provisioner, the ACK including a timestamp from the provisioner. The method also includes devices generating a timestamp-based one-time password (TOTP) derived from the time received from the provisioner and sending the device TOTP and a remote-Server address (Uniform Resource Identifier, URI) to the provisioner.

The method includes the provisioner finding the UUID of the device and forwarding the message from device to the remote server over a secure connection. The method includes remote server verifying UUID received from the provisioner and matching the device TOTP with its own TOTP. The method further includes, the provisioner receiving a message from the remote server and decrypting it to receive the onboarding key and the provisioner receiving an encrypted message from the remote server for the device and forwarding it to the device. The encrypted message from the remote server to the device includes the onboarding key and provisioner ID. The method then includes the device receiving from the provisioner, network credentials, a provisioner TOTP, the provisioner ID encrypted in a message using onboarding key. Finally, the method includes device generating authentication TOTP. If the authentication TOTP matches the provisioner TOTP and the provisioner ID received by device from remote server and provisioner ID given by the provisioner matches, the device joins the secure network using the credentials provided by provisioner.

Another embodiment includes a wireless node, or device, comprising a first wireless communication interface, a second wireless communication interface, a memory; and a controller coupled to the first wireless communication interface, the second wireless communication interface, and the memory. In this embodiment, the controller is configured to advertise over a first wireless protocol with the first wireless communication interface to onboard to a secure network with the second wireless communication interface. The controller then receives an acknowledgement (ACK) from a provisioner on the first wireless communication interface, the ACK including a timestamp, first provisioner ID from the provisioner and generates a device timestamp-based one-time password (TOTP) derived from the time received from the provisioner. The controller sends the device TOTP, UUID, and a remote-server address (Uniform Resource Identifier, URI) to the provisioner. The provisioner forwards the UUID and device TOTP to a remote server with a second wireless protocol. Once the remote server finds the UUID and the device TOTP matches a server TOTP, then the controller receives from the provisioner, a message from the remote server and decrypts the message from the remote server, which includes an onboarding key. The controller may then receive, by the provisioner, network credentials and a provisioner TOTP, generate an authentication TOTP, and if the authentication TOTP and the provisioner TOTP match and a second provisioner ID included in the network credentials matches a the first provisioner ID, communicate with a secure network with the second wireless protocol with the second wireless communication interface.

An embodiment includes a non-transitory computer-readable medium on which instructions for provisioning a wireless device on secure network are stored. The instructions may include instructions for a controller to advertise over a first wireless protocol with the first wireless communication interface to onboard to a secure network with the second wireless communication interface. The controller then receives an acknowledgement (ACK) from a provisioner on the first wireless communication interface, the ACK including a timestamp, first provisioner ID from the provisioner and generates a device timestamp-based one-time password (TOTP) derived from the time received from the provisioner. The controller sends the device TOTP, UUID, and a remote-server address (Uniform Resource Identifier, URI) to the provisioner. The provisioner forwards the UUID and device TOTP to a remote server with a second wireless protocol. Once the remote server finds the UUID and the device TOTP matches a server TOTP, then the controller receives from the provisioner, a message from the remote server and decrypts the message from the remote server, which includes an onboarding key. The controller may then receive, by the provisioner, network credentials and a provisioner TOTP, generate an authentication TOTP, and if the authentication TOTP and the provisioner TOTP match and a second provisioner ID included in the network credentials matches a the first provisioner ID, communicate with a secure network with the second wireless protocol with the second wireless communication interface.

Other aspects and advantages of the described embodiments will become apparent from the following detailed description, taken in conjunction with the accompanying drawings, illustrating by way of example the principles of the described embodiments.

DETAILED DESCRIPTION

Figure 1:
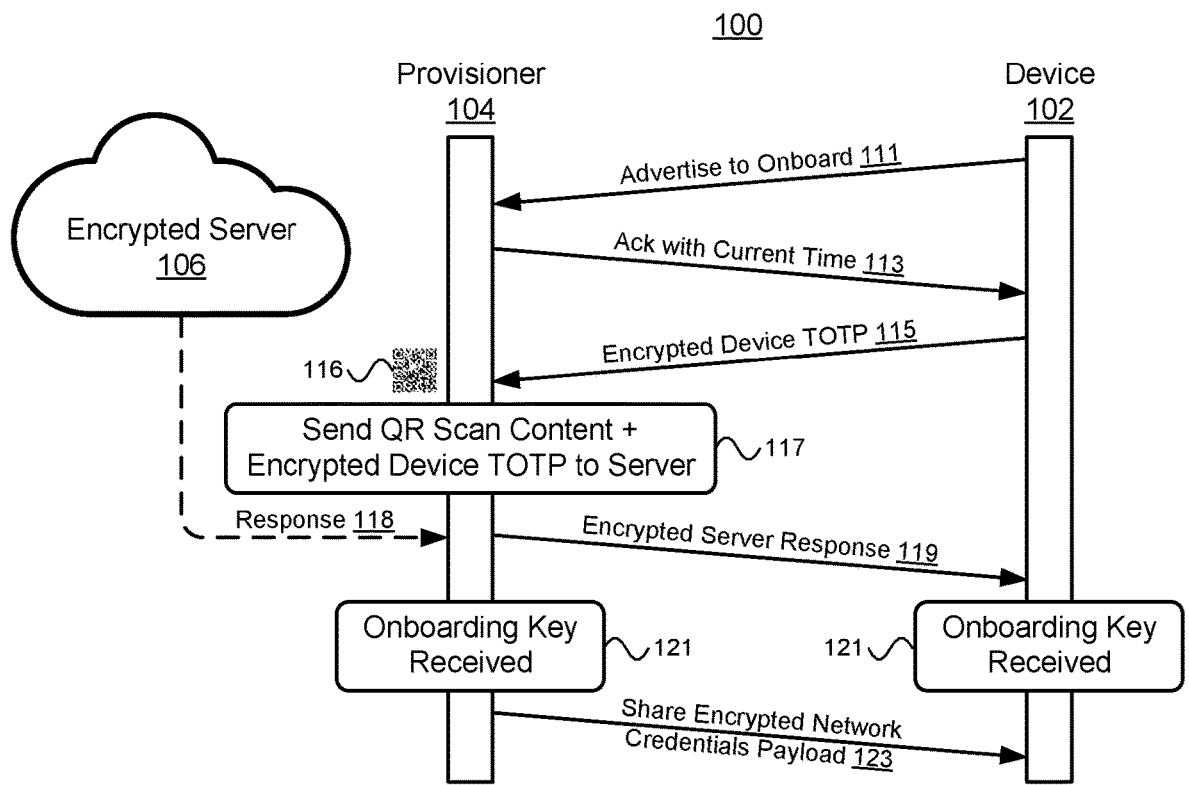
FIG. 1 shows an onboarding scheme provisioning a wireless device onto a secure network, according to one embodiment.

The following description sets forth numerous specific details such as examples of specific systems, components, methods, and so forth, in order to provide a good understanding of various embodiments of the communication schemes and techniques. It will be apparent to one skilled in the art, however, that at least some embodiments may be practiced without these specific details. In other instances, well-known components or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present invention.

References in the description to "an embodiment", "one embodiment", "an example embodiment", "some embodiments", and "various embodiments" mean that the particular feature, structure, or characteristic being referred to is included in at least one embodiment of the invention. Further, the appearances of the phrases "an embodiment", "one embodiment", "an example embodiment", "some embodiments", and "various embodiments" in various places in the description do not necessarily all refer to the same embodiment(s).

In various embodiments, the communication schemes and techniques described herein may comprise one or more methods that are executed by one or more devices and/or controllers thereof. Although the operations of such method (s) are shown and described hereinafter in a particular order, the operations of each method may be altered so that certain operations may be performed in a different order or so that certain operation(s) may be performed, at least in part, concurrently and/or in parallel with other operations. In other embodiments, instructions or sub-operations of distinct operations may be executed in an intermittent and/or alternating manner. Thus, the various method embodiments of the described techniques, as well as the order of operations therein, are to be regarded in an illustrative rather than a restrictive sense.

The described embodiments include systems, methods, and apparatuses for onboarding a wireless device onto a secure network with a provisioning device.

Onboarding a wireless device onto a secure network may not have a rich user interface, creating difficulty in the process. Many users struggle to configure such wireless devices, and the existing solutions to deliver private network credentials to a device without a rich user interface are error-prone, and often quite insecure, exposing private network credentials over an ad-hoc Wi-Fi network between the device cloud application and the device. This embodiment uses time-stamp-based one-time passwords (TOTPs) and credential information stored on a device and a remote server to establish a secure connection between a device and remote server using an intermediary device (a provisioner) with a non-secure connection to the wireless device and a secure connection to the remote server. The existing solutions—which are mostly based on local communication between the user and the wireless device (typically through a smart phone) can be slow, difficult to set-up (and re set-up), requiring manual intervention and, hence, difficult to operate for multiple devices. Such existing methods may also be error-prone and less secure to known security attacks (like Man-in-the-Middle or Replay attacks). By using the combination of a provisioner and a remote server, and using a non-secure, connectionless communication between the device and provisioner, this solution reduces the set-Cypress up difficulty significantly, requires zero human intervention and improves the latency while onboarding multiple devices while being resistant to known security attacks.

At least some embodiments includes a connected wireless device (a wireless device that has internet connectivity), a provisioning device or provisioner (the device that allows joining of a network, for example a smartphone), a provisioning application (the software application, which may be owned and operated by the provisioner, that connects to the device), the federated device cloud application (which may be run as a service by an operator), and the internet (providing connectivity from the provisioner to the remote server).

At least some of the described embodiments make it dramatically easier to connect internet-enabled products to wireless networks. Many of these devices (such as, Wi-Fi-enabled printers, lightbulbs, and/or kitchen appliances) do not have a rich user interface with a screen and keyboard, so it is difficult to configure these devices to connect to the wireless network. At least some of the described embodiments create a way to instantly and securely connect devices to the internet.

FIG. 1 illustrates an onboarding scheme 100 whereby a device 102 is provisioned onto a secure network (not shown) by a provisioner 104. The provisioner 104 may have a secure connection with an encrypted server (also referred to herein as a cloud server or a remote server). The provisioner may establish a non-secure connection with device 102, through which provisioning on the secure network with the encrypted server is established.

Onboarding scheme 100 may be begin by device 102 advertising its intent to onboard over a wireless medium (not shown) in step 111. The intent/request to onboard may be received by provisioner 104, after which provisioner 104 returns an acknowledgement (Ack) with the current time, as defined by provisioner 104. Device 102 may then return an encrypted device time-stamped one-time password (TOTP) to the provisioner in step 115. Upon receipt of the encrypted device TOTP, provisioner 104 may send QR scan content 116 and the encrypted device TOTP to encrypted server 106 in step 117. Encrypted server 106 may provide a response 118 to provisioner 104 based on processing the QR scan content 116 and the encrypted device TOTP. Communication between the provisioner and the encrypted server may be over a secure connection. Upon receipt of the response 118 from encrypted server 106, provisioner 104 may provide the response 118 to device 102 in step 119. An onboarding key may be received by both device 102 and provisioner 104 in step 121 and provisioner 102 may share encrypted network credentials with device 102 in step 123.

Figure 2A:
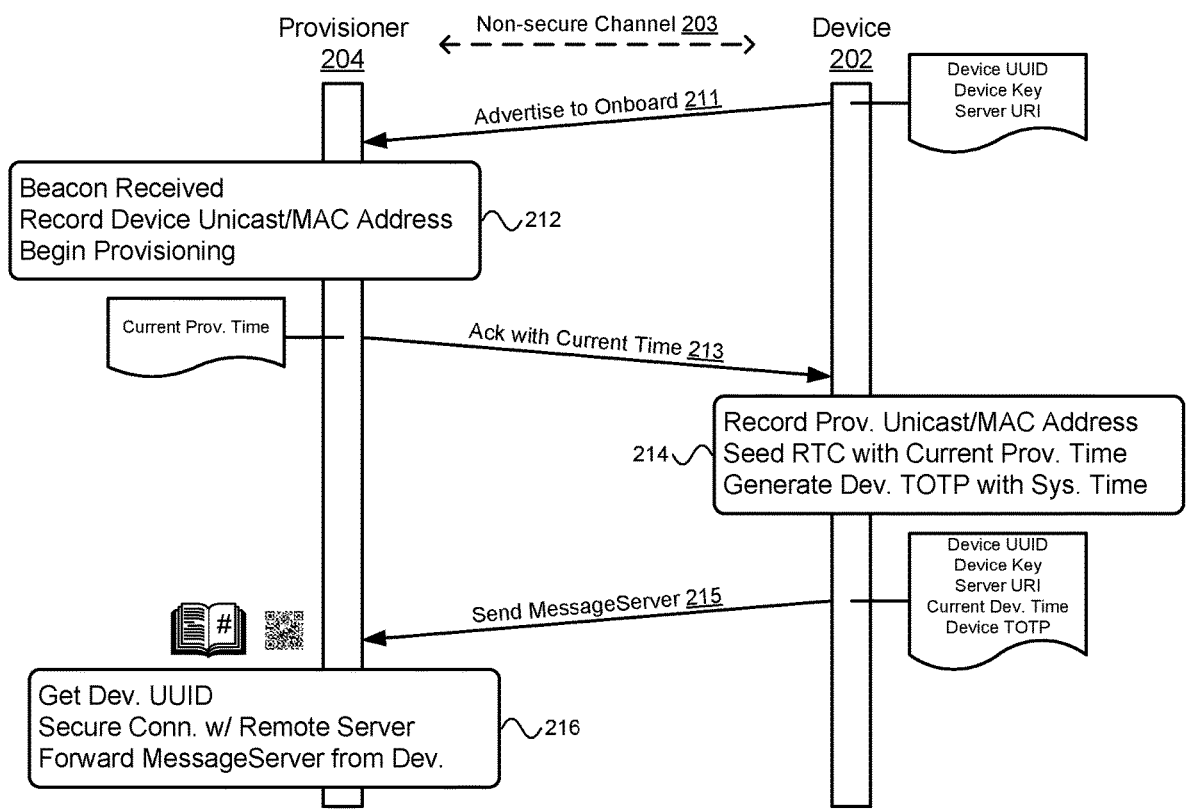
FIGS. 2A-C shows an onboarding scheme provisioning a wireless device onto a secure network, according to another embodiment.
Figure 2B:
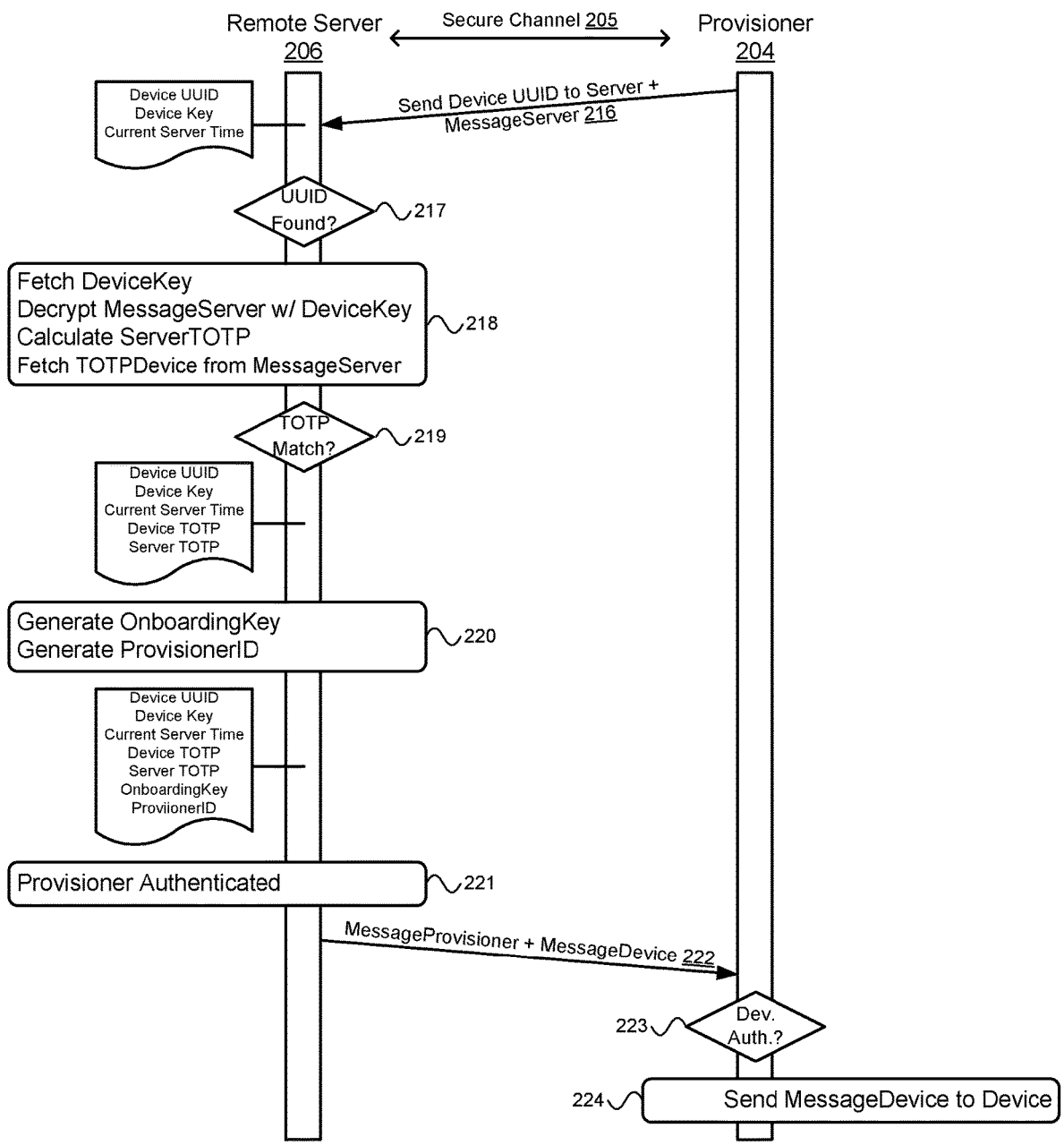
Figure 2C:
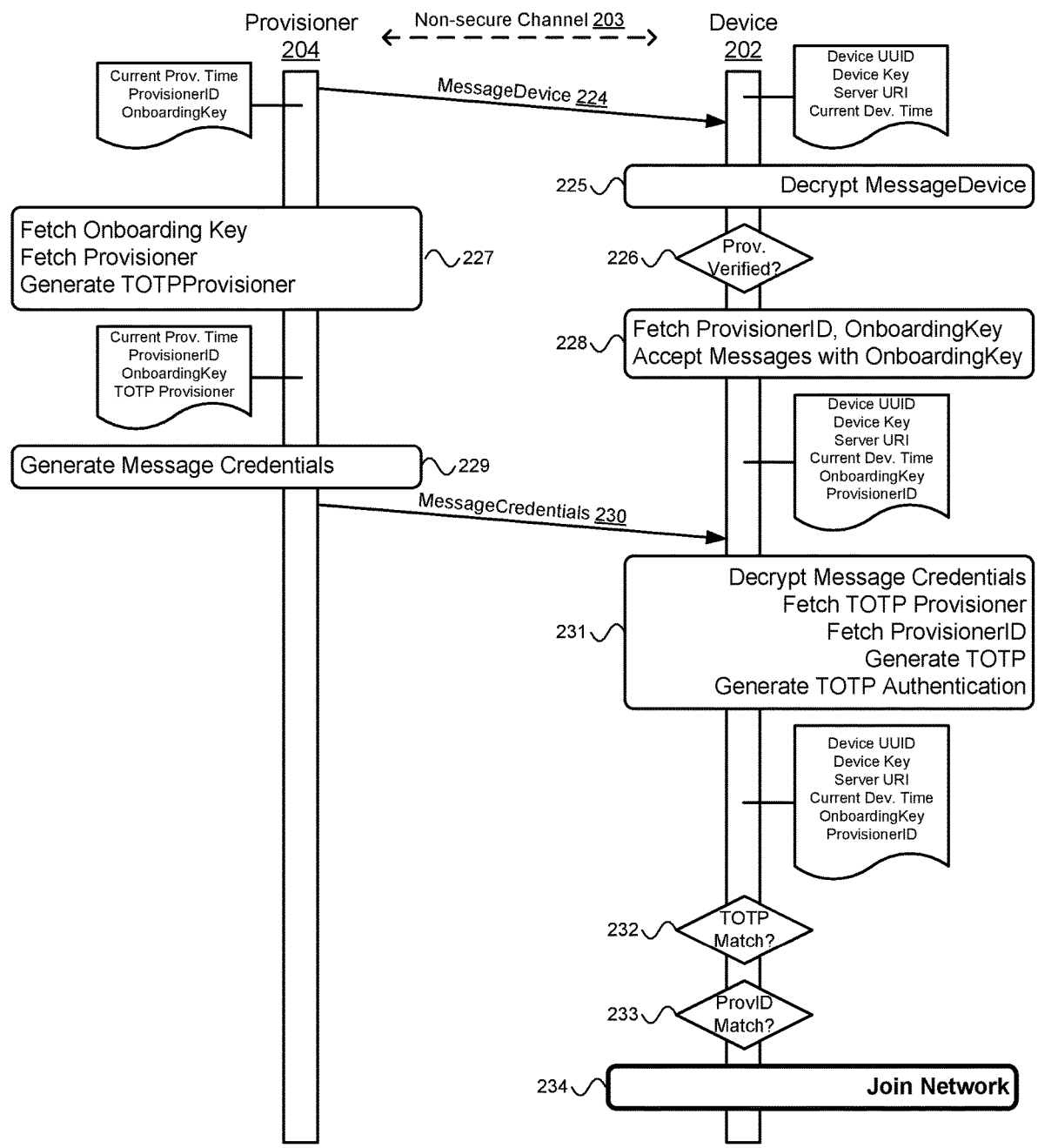

FIGS. 2A-2C illustrate details of an onboarding scheme 200 whereby a device 202 is provisioned onto a secure network (not shown) including remote server 206 through a provisioner 204. In FIG. 2A, a non-secure connection between device 202 and provisioner 204 is established. The non-secure nature of connection 203 is illustrated as a dashed line. Non-secure connection 203 may be a discrete connection between provisioner 204 and device 202, or it may be enabled by broadcasting/unicasting by provisioner 204 and device 202, without any formal connection between the two. First, device 202 advertises on a non-secure wireless medium the intention to onboard and be provisioned on a secure wireless network in step 211. Device 202 has stored in its memory a device universally unique identifier (UUID), a device key, and a server uniform resource identifier (URI). The device UUID may be stored in the device memory during manufacturing, such that it is a trusted UUID. In step 212, provisioner 204 receives the advertisement (beacon) from device 202 and records device 202's unicast/MAC address and begins provisioning. Provisioner 204 records the current time of the provisioner (Current Prov. Time). Provisioner 204 provides an Ack with the Current Prov. Time in step 213.

Device 202 receives the Ack from provisioner 204, records provisioner 204's unicast/MAC address, seeds it's real-time clock (RTC) with the Current Provisioner Time, and generates a device TOTP with the Current System Time (derived from the Current Provisioner Time) in step 214. Device 202 may have stored in memory its device UUID, device key, server URI, the Current Device Time derived from the seeded RTC, and a device TOTP. The device TOTP may be derived from the device key and the current device time and may be a hash message authentication code (HMAC) generated by an advanced encryption scheme (AES). Device 202 responds to the Ack from provisioner 204 with a message to the remote server 206 (MessageServer) in step 215. Device 202 may identify the remote server 206 to provisioner 204 by providing the remote server URI in its response to the Ack. MessageServer is provided to provisioner 204 to pass on to remote server 206 via a secure connection between them. Provisioner 204 may acquire the device UUID from external out-of-box (OOB) methods, such as scanning a QR code printed on device 202 or on the packaging for device 202 (not shown). The device UUID may also be printed in device user manuals or instruction manuals included with device 202. The device UUID may then be entered into provision 204 by a user through the user interface. Provisioner 204 then establishes a secure connection with remote server 206 and forwards MessageServer to remote server 206 in step 216.

FIG. 2B illustrates communication between provisioner 204 and remote server 206 over a secure connection. The secure nature of connection 205 is illustrated by a solid line. Provisioner 204 sends the device UUID and MessageServer from device 202 to remote server 206 in step 216 (also shown in FIG. 2A). Remote server 206 may have stored in a memory (or in a server-accessible database) the device UUID, the device key, and the Current Server Time. If the device UUID is found in step 217, remote server 206 may fetch the device key and decrypt MessageServer using the device key in step 218. Also in step 218, remote server 206 may calculate a server TOTP (ServerTOTP) and fetch DeviceTOTP from MessageServer. If DeviceTOTP and ServerTOTP match in step 219, remote server 206 may generate an OnboardingKey that may be used between provisioner 204 and device 202 as well as a ProvisionerID, which is unique to provisioner 204 in step 220.

Provisioner 204 may be authenticated in step 221, after which remote server 206 may signal to device 202 that provisioner 204 is authenticated. The authenticated status of provisioner 204 may be included in a message to the device (MessageDevice) that is encrypted with the device key. MessageDevice may also include the device UUID, ProvisionerID, and the OnboardingKey. Remote server 206 may provide two messages to provisioner 204, MessageProvisioner and MessageDevice, in step 222. MessageProvisioner may include the device authentication status, the ProvisionerID, and the OnboardingKey. If MessageProvisioner includes information stating that the device 202 is authenticated in step 223, provisioner 204 may send MessageDevice to device 202 in step 224. If MessageProvisioner includes information stating that device 202 is not authenticated, the onboarding process may terminate. In one embodiment, the failure to onboard may be displayed on provisioner 204. In still another embodiment, the failure to onboard, and reasons for the failure, may be communicated to the remote server. In this embodiment, the device manufacturer may be alerted to problems in the onboarding process may be able to take corrective actions.

FIG. 2C illustrates communication between provisioner 204 and device 202 over a non-secure communication channel. The non-secure nature of communication channel 203 is illustrated by a dashed line. Non-secure communication channel 203 may be a discrete connection between provisioner 204 and device 202, or it may be enabled by broadcasting/unicasting by provisioner 204 and device 202, without any formal connection between the two. Provisioner 204 may send MessageDevice to device 202 in step 224 (also shown in FIG. 2B). Device 202 may decrypt MessageDevice in step 225. If MessageDevice includes information that provisioner 204 is authenticated in step 226, device 202 may fetch the ProvisionerID and the Onboarding Key in step 228. If MessageDevice includes information stating that provisioner 204 is not authenticated, the onboarding process may terminate. In one embodiment, the failure to onboard may be displayed on provisioner 204. In still another embodiment, the failure to onboard, and reasons for the failure, may be communicated to the remote server. In this embodiment, the device manufacturer may be alerted to problems in the onboarding process may be able to take corrective actions.

Also in step 228, device 202 may continue to accept messages from provisioner 204 that are encrypted with the OnboardingKey. Provisioner 204 may fetch the OnboardingKey from MessageProvisioner, fetch the Current Prov. Time, and generate a ProvisionerTOTP in step 227. The provisioner TOTP may be derived from the OnboardingKey and the Current Provisioner Time and may be a hash message authentication code (HMAC) generated by an advanced encryption scheme (AES). Provisioner 204 may then provide generate a message with credentials (MessageCredentials) for device 202 in step 229. MessageCredentials may be an encrypted message using OnboardingKey, including an SSID, passphrase, the ProvisionerID, and the provisioner TOTP. Provisioner 202 may send MessageCredentials to device 204 in step 230. Device 202 may decrypt MessageCredentials using the OnboardingKey, fetch ProvisionerTOTP and ProvisionerID from MessageCredentials and generate an AuthenticationTOTP in step 231. If AuthenticationTOTP matches ProvisionerTOTP in step 232 and the ProvisionerID fetched from MessageCredentials matches that which was stored on device 202 in step 233, device 202 may join the network including remote server 206 in step 234.

Figure 3:
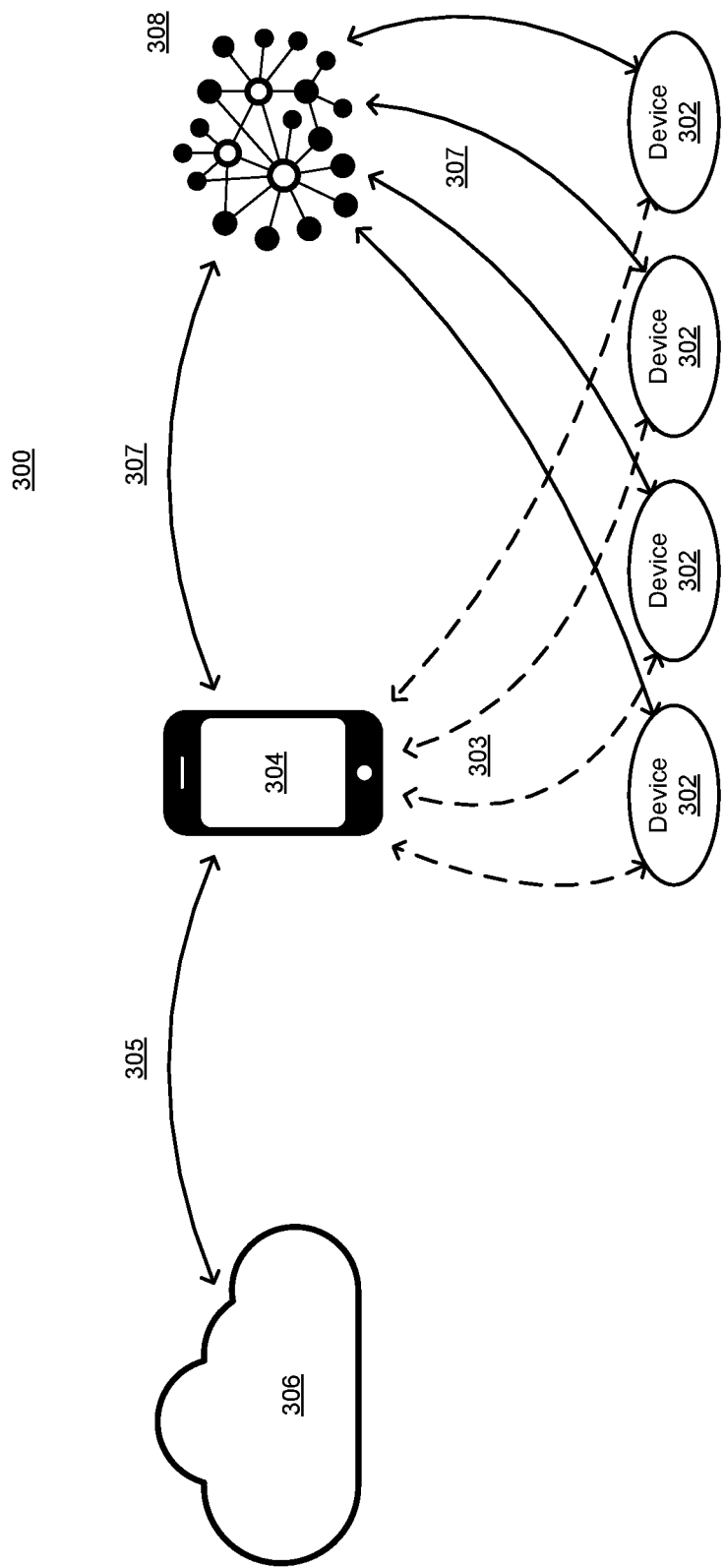
FIG. 3 shows a system including a number of wireless devices, a provisioner, and a secure network onto which the wireless devices are provisioned, according to one embodiment.

FIG. 3 illustrates a system 300 including devices 302, a provisioner 304 a remote server 306, and a secure network 308. Devices 302 may be in communication with provisioner 304 over a non-secure channel 303, illustrated as a dashed line. Provisioner 304 may be in communication with remote server 306 over a secure connection 305, illustrated as a solid line. After the provisioning/onboarding process is complete, devices 302 may be in secure communication with secure network 308 over a secure connection 307, illustrated as a solid line. In various embodiments secure network 308 may include or be connected to remote server 306 or network secure 308 may be separate from remote server 306, whereby a connection between provisioner 304 and remote server 306 is used only to procure onboarding information for devices 302 onto secure network 308. In one embodiment multiple devices may be provisioned onto secure network 308 simultaneously. In this embodiment, it is not necessary to provision a first device, then a second device, then a third device, etc. Rather, each of the devices may be provisioned simultaneously onto secure network 308 using device-specific device TOTPs and the device specific UUIDs according to the method discussed above with regard to FIGS. 2A-C. Furthermore, while a single provisioner 304 is shown, in other embodiments multiple devices may be provisioned onto secure network 308 by different provisioners.

In one embodiment of FIG. 3, all of connections of non-secure channel 303 use the same protocol. In another embodiment, different devices 302 may establish a non-secure connection with provisioner 204 using different protocols and/or over different non-secure channels. Devices 302 may each use a different protocol in some embodiments. In still other embodiments, some of devices 302 may use the same protocol while others of devices 302 may use a different protocol.

In another embodiment of FIG. 3, the non-secure channel 303 between devices 302 and provisioner 304 may be different from the secure connection between provisioner 304 and remote server 306. For example, non-secure channel 303 may be over a Bluetooth or Bluetooth Low-energy (BLE) protocol, while secure connection 305 is over Wi-Fi. In another embodiment, non-secure channel 303 and secure connection 305 may be over the same protocol. For example, non-secure channel 303 and secure connection 305 may both be Wi-Fi.

Figure 4:
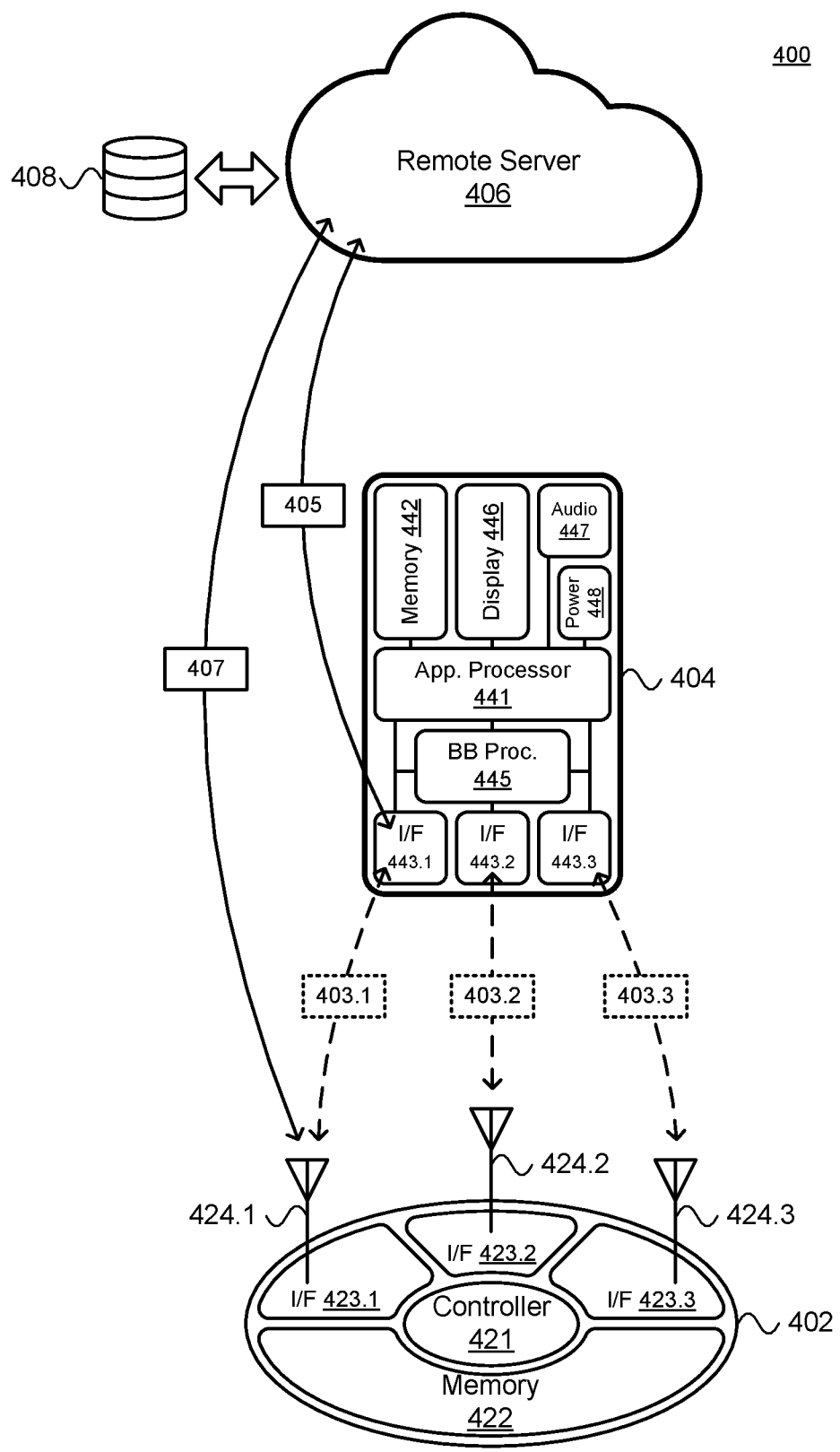
FIG. 4 shows a system including a provisioner, a smart phone, for onboarding a wireless device onto a secure wireless network using one of a number of interface protocols, according to one embodiment.

In still another embodiment, secure connection 307 may be over the same protocol as secure connection 305. For example, both secure connection 305 and secure connection 307 may be Wi-Fi. Alternatively, secure connection 305 may be over a different protocol than connection 307. Provisioner 304 may be in communication with secure network 308 over secure 307, but it may not be on communication with the same secure network to which devices are provisioned. FIG. 4 illustrates a system 400 including a device 402, a provisioner 404, and a remote server 406. System 400 may be for provisioning device 402 onto a secure network including remote server 406. Device 402 may include a controller 421 for executing instructions and accessing information stored on memory 422. Memory 422 may be non-transitory computer-readable medium. Memory 422 may be a single memory array in one embodiment. In another embodiment, memory 422 may comprise multiple separate memories accessible by controller 421. Device 402 may also include a number of interface circuits (I/F) 423, each coupled to an antenna 424. Interfaces 423 may be for communicating via a variety of wireless communication protocols to provision 404 and to remote server 406. Communication with provisioner 404 may be by non-secure connections 403. Communication with secure server 406 may be by secure connection 407.

Provisioner 404 may be a mobile phone or other wireless device. Provisioner 404 may include a baseband processor (BB Proc.) 445 coupled to a number of interface circuits (I/F) 443. Interface circuits 443 may be used to communicate with device 402, with remote server 406, or with another wireless network (not shown). Provision 441 may also include an application processor for handling information received via interface circuits 442 and for executing instructions for the onboarding of device 402 onto a secure connection 407 with remote server 406. Application processor 441 may be coupled to a memory 442 for access to executable functions and for access to stored information used in the onboarding process. Application processor 441 may also be coupled to a display and display driver 446 for displaying a variety of information to a user. In some embodiments the displayed information may be for the onboarding of device 402 according to the methods described herein. Provisioner 404 may also include audio control module 447 and power control and management module 448, both coupled to application processing 441.

Remote server 406 may have a secure connection 405 to provisioner 404 and a secure connection 407 to device 402 after onboarding is complete and successful. Remote server may also include a connection to a database 408, which may store information for use by remote server 406 in the onboarding of device 402 according to the methods described herein.

In one embodiment, non-secure connection 403.1 may use the same interface 423 for provisioning (non-secure connection) and for the secure connection 407 with remote server 406. In another embodiment, the non-secure connection 403.2 may use a different interface 423.2 for provisioning as that used for secure connection.

Figure 5A:
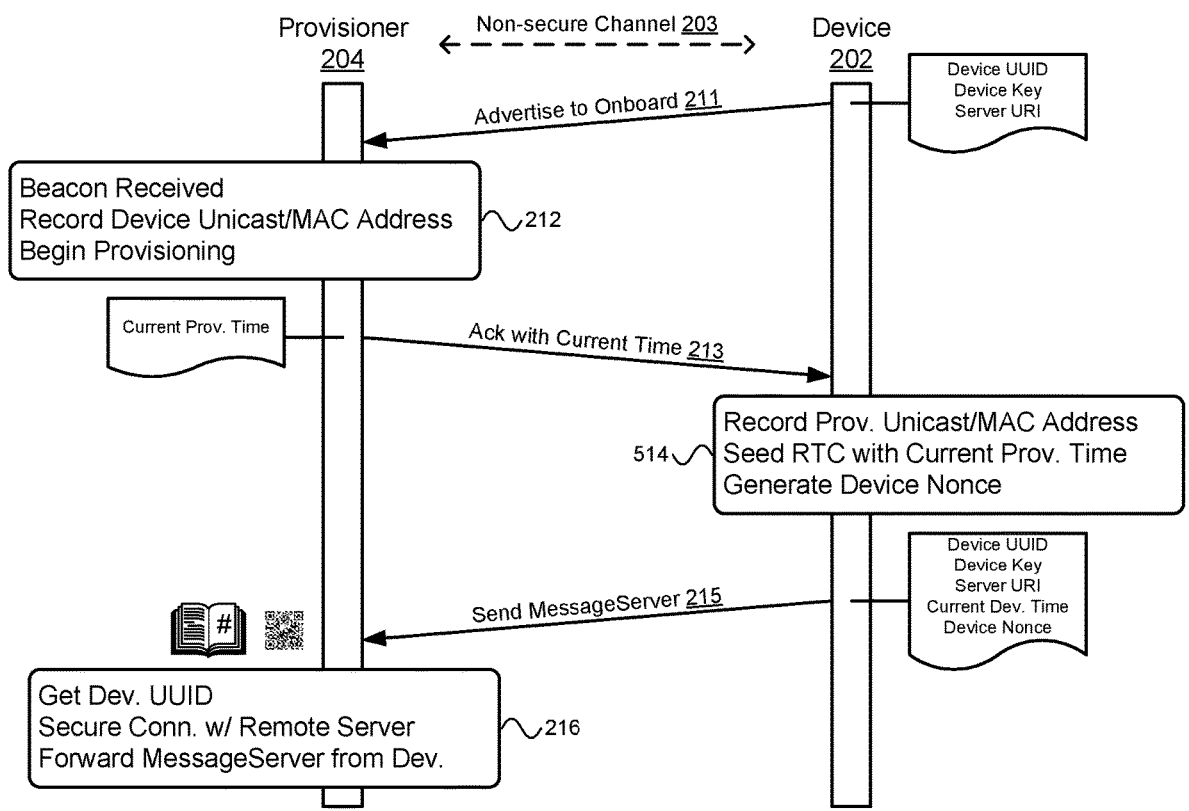
FIGS. 5A-C shows an onboarding scheme provisioning a wireless device onto a secure network, according to another embodiment.
Figure 5B:
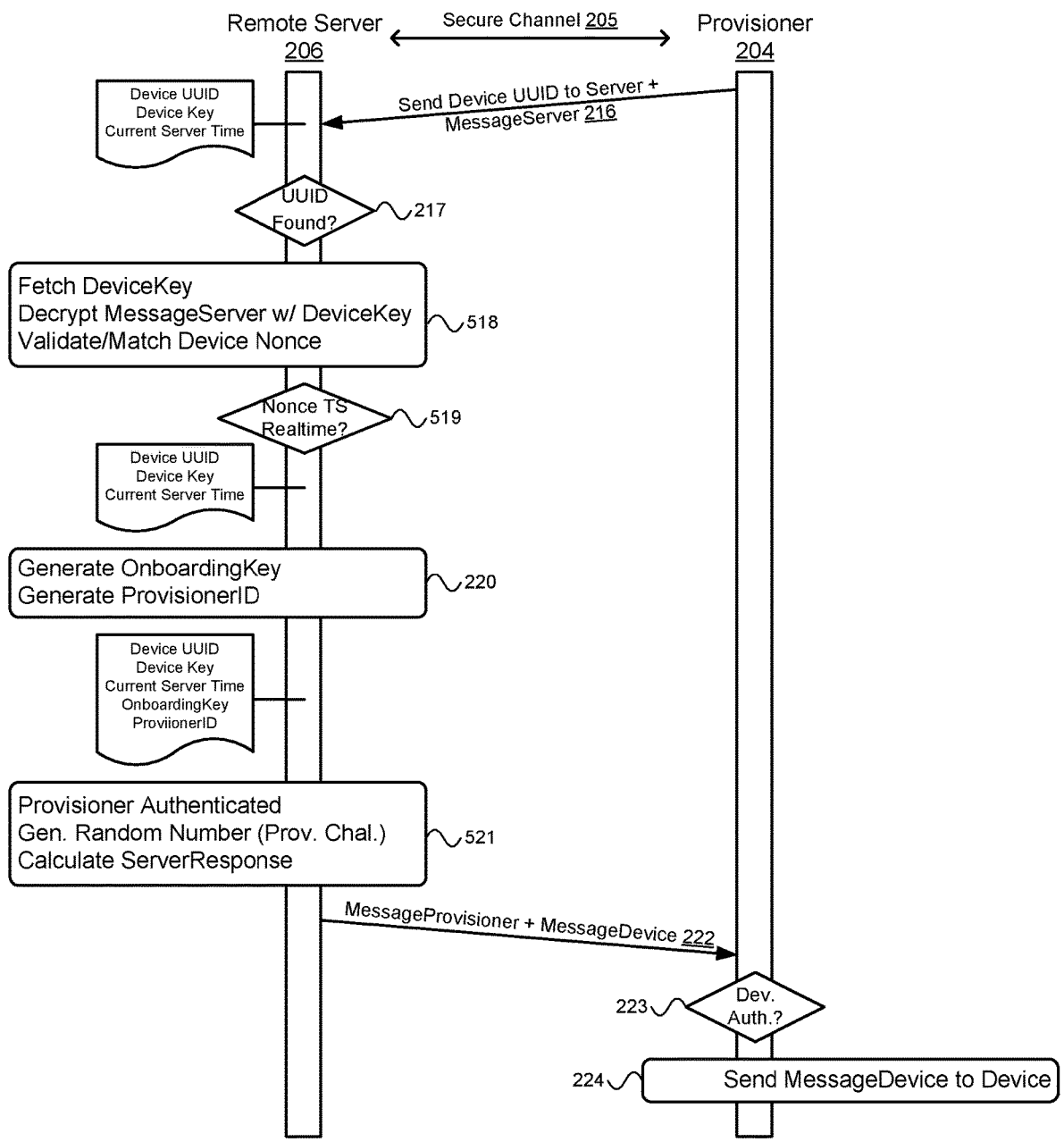
Figure 5C:
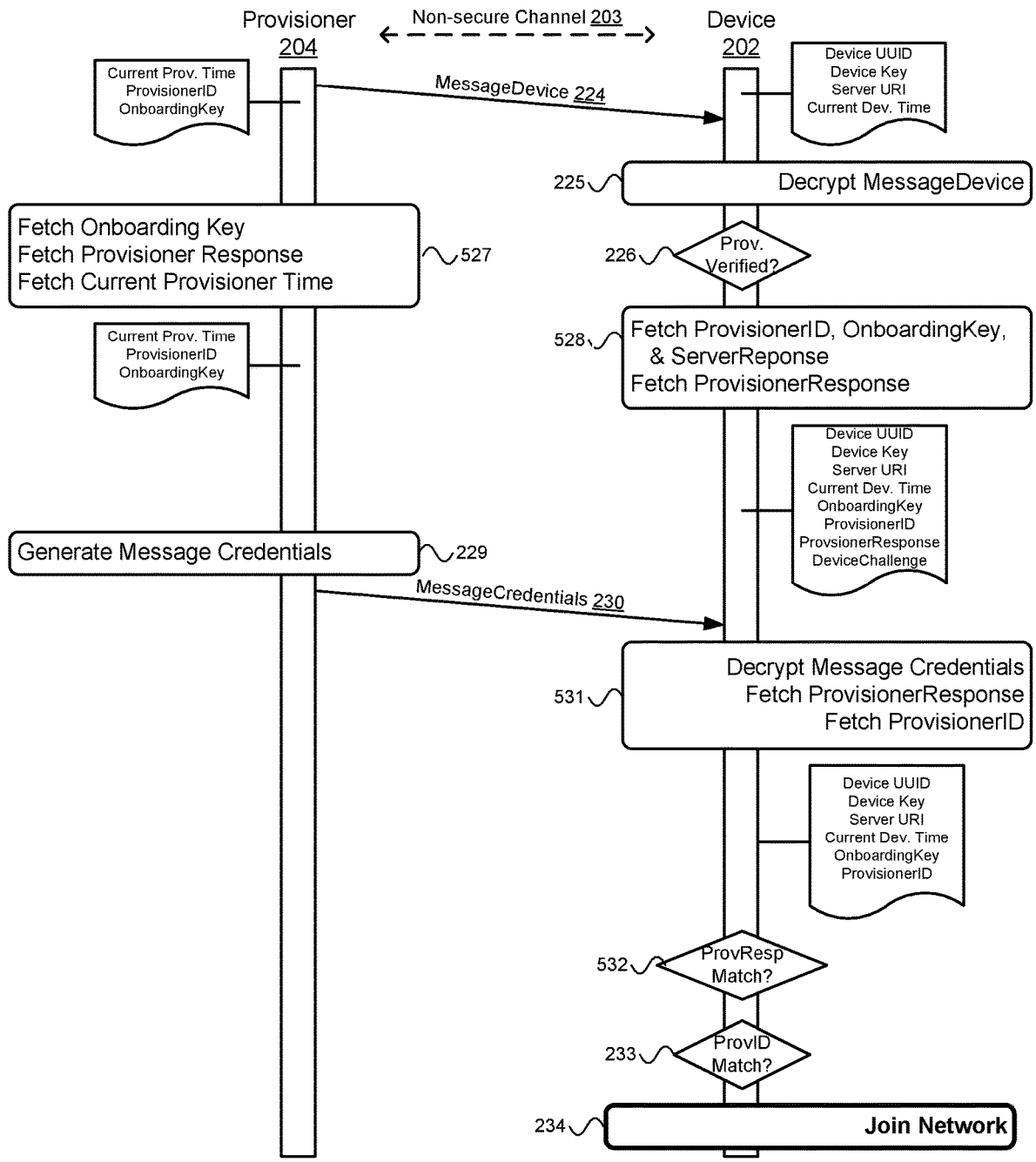

FIGS. 5A-5C illustrate details of an onboarding scheme 500 whereby a device 202 is provisioned onto a secure network (not shown) including remote server 206 through a provisioner 204. Reference numbers in FIGS. 5A-5C correspond to reference numbers in FIGS. 2A-2C when information and actions contained therein correspond.

In FIG. 2A, a non-secure connection between device 202 and provisioner 204 is established. The non-secure nature of connection 203 is illustrated as a dashed line. Non-secure connection 203 may be a discrete connection between provisioner 204 and device 202, or it may be enabled by broadcasting/unicasting by provisioner 204 and device 202, without any formal connection between the two. First, device 202 advertises on a non-secure wireless medium the intention to onboard and be provisioned on a secure wireless network in step 211. Device 202 has stored in its memory a device universally unique identifier (UUID), a device key, and a server uniform resource identifier (URI). The device UUID may be stored in the device memory during manufacturing, such that it is a trusted UUID. In step 212, provisioner 204 receives the advertisement (beacon) from device 202 and records device 202's unicast/MAC address and begins provisioning. Provisioner 204 records the current time of the provisioner (Current Prov. Time). Provisioner provides an Ack with the Current Prov. Time in step 213.

Device 202 receives the Ack from provisioner 204, records provisioner 204's unicast/MAC address, seeds it's real-time clock (RTC) with the Current Provisioner Time, and generates a device nonce with the Current System Time (derived from the Current Provisioner Time) in step 514. The device nonce may also be generated with a random number, or device challenge. Device 202 may have stored in memory its device UUID, device key, server URI, the Current Device Time derived from the seeded RTC, and a device nonce. Device 202 responds to the Ack from provisioner 204 with a message to the remote server 206 (MessageServer) in step 215. Device 202 may identify the remote server 206 to provisioner 204 by providing the remote server URI in its response to the Ack. MessageServer is provided to provisioner 204 to pass on to remote server 206 via a secure connection between them. Provisioner 204 may acquire the device UUID from external out-of-box (OOB) methods, such as scanning a QR code printed on device 202 or on the packaging for device 202 (not shown). The device UUID may also be printed in device user manuals or instruction manuals included with device 202. The device UUID may then be entered into provisioner 204 by a user through the user interface. Provisioner 204 then establishes a secure connection with remote server 206 and forwards MessageServer to remote server 206 in step 216.

FIG. 2B illustrates communication between provisioner 204 and remote server 206 over a secure connection 205. The secure nature of connection 205 is illustrated by a solid line. Provisioner 204 sends the device UUID and MessageServer from device 202 to remote server 206 in step 216 (also shown in FIG. 2A). Remote server 206 may have stored in a memory (or in a server-accessible database) the device UUID, the device key, and the Current Server Time. If the device UUID is found in step 217, remote server 206 may fetch the device key and decrypt MessageServer using the device key in step 218. Also in step 218, remote server 206 may validate and match the device nonce retrieved from MessageServer. If the device nonce timestamp is in real time in step 519, remote server 206 may generate an OnboardingKey that may be used between provisioner 204 and device 202 as well as a ProvisionerID, which is unique to provisioner 204 in step 220.

Provisioner 204 may be authenticated in step 521, after which remote server 206 may signal to device 202 that provisioner 204 is authenticated. A provisioner challenge may be generated from a random number and the server response may be calculated from the DeviceChallenge and the ProvisionerResponse. The authenticated status of provisioner 204 may be included in a message to the device (MessageDevice) that is encrypted with the device key. MessageDevice may also include the device UUID, ProvisionerID, and the OnboardingKey. Remote server 206 may provide two messages to provisioner 204, MessageProvisioner and MessageDevice, in step 222. MessageProvisioner may include the device authentication status, the ProvisionerID, the OnboardingKey, and the ProvisionerResponse. If MessageProvisioner includes information stating that the device 202 is authenticated in step 223, provisioner 204 may send MessageDevice to device 202 in step 224. If MessageProvisioner includes information stating that device 202 is not authenticated, the onboarding process may terminate. In one embodiment, the failure to onboard may be displayed on provisioner 204. In still another embodiment, the failure to onboard, and reasons for the failure, may be communicated to the remote server. In this embodiment, the device manufacturer may be alerted to problems in the onboarding process may be able to take corrective actions.

FIG. 2C illustrates communication between provisioner 204 and device 202 over a non-secure connection 203. The non-secure nature of connection 203 is illustrated by a dashed line. Non-secure connection 203 may be a discrete connection between provisioner 204 and device 202, or it may be enabled by broadcasting/unicasting by provisioner 204 and device 202, without any formal connection between the two. Provisioner 204 may send MessageDevice to device 202 in step 224 (also shown in FIG. 2B). Device 202 may decrypt MessageDevice in step 225. If MessageDevice includes information that provisioner 204 is authenticated in step 226, device 202 may fetch the ProvisionerID the OnboardingKey, and ServerResponse in step 228. Device 202 may also fetch the ProvisionerResponse. If MessageDevice includes information stating that provisioner 204 is not authenticated, the onboarding process may terminate. In one embodiment, the failure to onboard may be displayed on provisioner 204. In still another embodiment, the failure to onboard, and reasons for the failure, may be communicated to the remote server. In this embodiment, the device manufacturer may be alerted to problems in the onboarding process may be able to take corrective actions.

Provisioner 204 may fetch the OnboardingKey from MessageProvisioner, fetch the Current Prov. Time, and fetch the ProvisionerResponse in step 227. Provisioner 204 may then provide generate a message with credentials (MessageCredentials) for device 202 in step 229. MessageCredentials may be an encrypted message using OnboardingKey, including an SSID, passphrase, the ProvisionerID, and the provisioner TOTP. Provisioner 202 may send MessageCredentials to device 204 in step 230. Device 202 may decrypt MessageCredentials using the OnboardingKey, fetch ProvisionerResponse and ProvisionerID from MessageCredentials in step 531. If the ProvisionerResponses from provisioner 204 and remote server 206 match in step 532, the challenge/response is successful. If the ProvisionerID fetched from MessageCredentials matches that which was stored on device 202 in step 533, device 202 may join the network including remote server 206 in step 234.

As used herein, the term "coupled to" means connected directly, or connected indirectly through one or more intervening components over PCB tracks/pads, switches, buses, hubs, trace lines, and/or programmable interconnects, as the case may be. Any of the signals provided through various PCB tracks/pads, switches, hubs, traces, and programmable interconnects may be time multiplexed with other signals and provided over one or more common or dedicated buses and/or signal traces. Each of the buses may alternatively include one or more single signal traces, and one or more signal traces may alternatively perform the function of a bus.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method for provisioning a wireless device on a secure network comprising:
   advertising over a first wireless communication interface to onboard to the secure network with a second wireless communication interface;
   receiving an acknowledgement (ACK) from a provisioner on the first wireless communication interface, the ACK including a time from the provisioner and a first provisioner ID;
   generating a device time-stamp-based one-time password (TOTP) derived from the time received from the provisioner;
   sending the device TOTP and a universally unique identifier (UUID) to the provisioner, the device TOTP and the UUID for the secure network;
   if the UUID is found and the device TOTP matches a server TOTP by a remote server, receiving by the provisioner, an onboarding key, network credentials, and a provisioner TOTP;
   generating and authentication TOTP;
   if the authentication TOTP and the provisioner TOTP match and a second provisioner ID included in the network credentials matches the first provisioner ID, joining the secure network with the second wireless communication interface.

2. The method of claim 1, wherein generating a device TOTP includes seeding a real-time clock (RTC) with the time from the provisioner such that a device time and a provisioner time are synchronized.

3. The method of claim 1, wherein the UUID is stored on the wireless device during manufacturing.

4. The method of claim 1, wherein the UUID is compared to a list of UUID's stored in a database of the remote server.

5. The method of claim 1, wherein a message from the remote server including the onboarding key further includes information on an authentication status of the provisioner.

6. The method of claim 5, further comprising, if the authentication status of the provisioner is not verified, rejecting communication from the provisioner.

7. The method of claim 1, wherein the authentication TOTP is derived from the onboarding key and a device time.

8. A wireless node comprising:
   a memory;
   a controller coupled to the memory, the controller for executing instructions to:
      advertise over a wireless communication interface to onboard to a secure network with a second wireless communication interface;
      receive an acknowledgement (ACK) from a provisioner on the first wireless communication interface, the ACK including a time from the provisioner and a first provisioner ID;
      generate a device time-stamp-based one-time password (TOTP) derived from the time received from the provisioner;
      send the device TOTP and a universally unique identifier (UUID) to the provisioner, the device TOTP and the UUID for the secure network;
      if the UUID is found and the device TOTP matches a server TOTP by a remote server, receive by the provisioner, an onboarding key, network credentials, and a provisioner TOTP;
      generate and authentication TOTP;
      if the authentication TOTP and the provisioner TOTP match and a second provisioner ID included in the network credentials matches the first provisioner ID, join the secure network with the second wireless communication interface.

9. The wireless node of claim 8, wherein a wireless protocol of the first wireless communication interface is a Bluetooth Low-Energy (BLE) protocol.

10. The wireless node of claim 8, wherein the onboarding key and the UUID are stored on the memory.

11. The wireless node of claim 8, wherein the controller is configured to send a remote server uniform resource identifier (URI) to the provisioner with the device TOTP.

12. The wireless node of claim 11, wherein the URI is for communicating the provisioner a location of the remote server providing onboarding service.

13. The wireless node of claim 8, wherein the controller is configured to seed a real-time clock (RTC) of the wireless node with the time from the provisioner such that a device time and a provisioner time are synchronized.

14. The wireless node of claim 8, wherein the UUID is stored in the memory during manufacturing.

15. The wireless node of claim 8, wherein a message from the remote server that includes the onboarding key further includes information on an authentication status of the provisioner.

16. The wireless node of claim 15, wherein, if the controller determines that the authentication status of the provisioner is not verified, rejecting communication from the provisioner.

17. The wireless node of claim 8, wherein the controller generates the authentication TOTP based on the onboarding key and a device time.

18. A non-transitory computer-readable medium on which instructions for provisioning a wireless device on a secure network are stored, the instructions for execution by a controller to:
   advertise over a wireless communication interface to onboard to the secure network with a second wireless communication interface;
   receive an acknowledgement (ACK) from a provisioner on the first wireless communication interface, the ACK including a time from the provisioner and a first provisioner ID;
   generate a device time-stamp-based one-time password (TOTP) derived from the time received from the provisioner;
   send the device TOTP and a universally unique identifier (UUID) to the provisioner, the device TOTP and the UUID for the secure network;
   if the UUID is found and the device TOTP matches a server TOTP by a remote server, receive by the provisioner, an onboarding key, network credentials, and a provisioner TOTP;
   generate and authentication TOTP;
   if the authentication TOTP and the provisioner TOTP match and a second provisioner ID included in the network credentials matches the first provisioner ID, join the secure network with the second wireless communication interface.

19. The non-transitory computer-readable medium of claim 18, wherein the instructions further comprise, if an authentication status of the provisioner is not verified, rejecting communication from the provisioner.

20. The non-transitory computer-readable medium of claim 18, wherein the authentication TOTP is derived from the onboarding key and a device time.

* * * * *